United States Patent [19]

Jopson et al.

[11] Patent Number: 4,973,120
[45] Date of Patent: Nov. 27, 1990

[54] OPTICAL ISOLATOR WITH RESONANT CAVITY HAVING GYROTROPIC MATERIAL

[75] Inventors: Robert M. Jopson; Julian Stone, both of Rumson, N.J.

[73] Assignee: AT&T Bell Laboratories, Murray Hill, N.J.

[21] Appl. No.: 345,861

[22] Filed: May 1, 1989

[51] Int. Cl.$^5$ ............................ G02F 1/09; G02F 1/21
[52] U.S. Cl. .............................. 350/96.13; 350/376; 350/385; 356/352
[58] Field of Search .................... 350/96.13, 375, 376, 350/377, 378, 384, 385; 356/351, 352

[56] References Cited

U.S. PATENT DOCUMENTS

| | | | |
|---|---|---|---|
| 3,523,718 | 8/1970 | Crow | 350/375 |
| 3,644,016 | 2/1972 | Macken | 356/352 |
| 4,033,670 | 7/1977 | Tanton et al. | 350/377 |
| 4,516,073 | 5/1985 | Doriath et al. | 350/377 |
| 4,563,092 | 1/1986 | Kaiser | 350/377 |
| 4,756,607 | 7/1988 | Watanbe et al. | 350/375 |
| 4,830,451 | 5/1989 | Stone | 356/352 |

FOREIGN PATENT DOCUMENTS 62-257032  11/1987  Japan .................................. 356/352

OTHER PUBLICATIONS

"Bulk Optical Isolator Tunable from 1.2 μm to 1.7 μm", by R. M. Jopson et al., Electronics Letters, Aug. 29, 1985, vol. 21, No. 18.

Primary Examiner—Bruce Y. Arnold
Assistant Examiner—Martin Lerner
Attorney, Agent, or Firm—Eli Weiss

[57] ABSTRACT

The invention is an optical isolator. In one embodiment the optical isolator comprises two linear polarizers, one at the input of the isolator and the other at the output. Positioned between the input and the output linear polarizer is a gyrotropic medium located within a resonant cavity such as a Fabry-Perot cavity. Interposed between the linear polarizer at the input of the isolator and the resonant cavity is a first polarization conversion means for converting received plane polarized optical energy from said linear polarizer to circularly polarized optical energy and interposed between the resonant cavity and the linear polarizer at the output of the isolator is a second polarization conversion means for converting received circular polarized optical energy from said resonant cavity to plane polarized optical energy. In an embodiment, the resonant cavity comprising the gyrotropic medium becomes the filtering medium to block reflected optical radiation.

7 Claims, 2 Drawing Sheets

OPTICAL ISOLATOR WITH RESONANT CAVITY HAVING GYROTROPIC MATERIAL

TECHNICAL FIELD

This invention relates generally to optical isolators and, more particularly, to optical isolators which utilize a resonant cavity to obtain a substantial reduction in size.

BACKGROUND OF THE INVENTION

Optical isolators are necessary to prevent reflected optical radiation from re-entering an optical device such as, for example, a laser. In optical communication systems, reflections of optical energy into a laser degrades the operation of the laser by causing amplitude fluctuations, mode partitioning, frequency shifts, and linewidth narrowing. Present optical communication systems use optical isolators at the output of a laser to prevent light from being reflected back into the laser. Such isolators are generally referred to as Faraday isolators and utilize the principles of linearly polarized (also referred to as plane polarized) electromagnetic energy in combination with Faraday rotation. Frequently, two isolators are used in tandem to provide as much as 60 db isolation. Typically, when designed to operate with optical energy at a wavelength of 1.5 μm, the optical isolator will have a length of several centimeters and require 8 optical surfaces. Present day optical isolators are large and bulky relative to optical fibers and, therefore, cannot readily be incorporated into a chip or become an integral part of an optical fiber.

SUMMARY OF THE INVENTION

The present invention relates to an optical isolator which is adapted to pass optical energy in one direction and block or substantially block optical energy in the opposite direction. In a typical installation an optical isolator is located at the output of a laser and passes optical energy generated by the laser to a receiving device i.e., an optical fiber. In one embodiment, the optical isolator can comprise two linear polarizers, one at the input of the isolator and the other at the output. Positioned between the input and output linear polarizers is a Faraday active gyrotropic medium located within a resonant cavity such as a Fabry-Perot cavity. Interposed between the linear polarizer at the input of the isolator and the resonant cavity is a first polarization conversion means for converting plane polarized optical energy received from said linear polarizer to circularly polarized optical energy and, interposed between the resonant cavity and the linear polarizer at the output of the isolator is a second polarization conversion means for converting circular polarized optical energy received from said resonant cavity to plane polarized optical energy. In one embodiment, the resonant cavity comprising the gyrotropic medium becomes the filtering medium to block reflected optical radiation.

DETAILED DESCRIPTION

Figure 1:
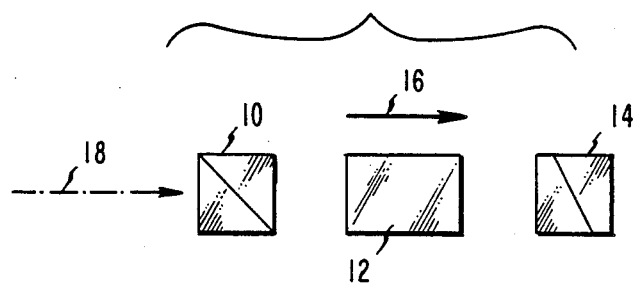
FIG. 1 is a schematic of a conventional Faraday effect optical isolator.

Referring to FIG. 1, there is illustrated an optical isolator which uses the Faraday rotational effect with received plane polarized optical energy to pass optical energy in one direction and block optical energy in the other direction. The device comprises a gyrotropic medium 12 interposed between an input linear or plane polarizer 10 and an output linear or plane polarizer 14. The gyrotropic medium 12 is located within an applied longitudinal magnetic field represented by the arrow 16. The gyrotropic medium is characterized by a Verdet constant V, which is defined as the rotation of the plane of polarization of the optical energy per unit length, per unit of applied field. The rotation of the plane polarized optical energy, as it passes through the gyrotropic medium, is given by the expression:

$$\theta_F = V \int H dl$$

where
V is the Verdet constant; and
H is the magnetic field.

In some materials, such as yttrium iron garnet (YIG) the Faraday rotation saturates at some applied magnetic field, in which case, the rotation is given by the expression:

$$\theta_F = a_F L$$

where
$a_F$ is the saturated specific rotation and
L is the length of the gyrotropic medium.

Typically, at a wavelength of 1.5 μm and a magnetic field of about 1 kgauss (which is readily obtainable from a samarium-cobalt magnet) a length of 2.6 μm give a rotation of 45 degrees in YIG, the most commonly used isolator material in the 1.3 μm–1.5 μm region of the spectrum.

Light 19 traveling through the optical isolator in the backward direction passes through linear polarizer 14 which is oriented at an angle; and the backward linearly polarized optical energy which emerges from polarizer 14 is oriented at this angle. The linearly polarized optical energy then enters Faraday rotator 12 which then rotates the plane of the linear polarized optical energy by the angle $\theta_F$. The linearly polarized optical energy from the Faraday rotator then enters polarizer 10 which is oriented to block the light from the Faraday rotator. In most isolators the Faraday rotators are designed to rotate the plane of the polarized optical energy by 45 degrees.

In the forward direction, light 18 passes through polarizer 10 and is linearly polarized at the angle of the polarizer 10. This light which is traveling to the right, then passes through the Faraday rotator where it is rotated further in the same sense as the rotation of the plane of polarization of optical energy traveling to the left. If the Faraday rotator is designed to rotate the plane of polarization of the linear polarized optical energy 45 degrees, then the optical energy which emerges from the Faraday rotator 12 is polarized parallel to the polarizer 14 and is fully transmitted.

Optical isolators which contain YIG or similar garnets have demonstrated low loss (~1 dB) and reasonably good isolation (−30 dB). However, they are relatively large because of the long ½ to 3 mm path length required in the Faraday rotator.

In the present invention, a gyrotropic medium which is located within a resonant device is substituted for the single-pass Faraday rotator. Briefly, by having the optical energy reflected back and forth a number of times within the gyrotropic medium, the overall length of the medium can be reduced because the total Faraday rotation is an accumulation of each rotation caused by each pass. Multiple reflections are obtained by placing the gyrotropic medium between two mirrors (either dielectric or metallic mirrors) which are deposited on the surface or by using a distributed grating reflector in a waveguide structure. When the round trip optical length of the path of the optical energy is an integral number of wavelengths, the device is said to be resonant and, in the absence of loss, is transparent.

For example, where the reflections are obtained with mirrors, the transmission of the structure at resonance is given by the expression $$T = \left[\frac{1}{1 + \frac{L}{1 - L - R}}\right]^2$$

where
L is the single pass loss within the resonator and
R is the reflectivity of the mirrors.
The number of passes N for which the emergent beam is reduced to one-half that of the first beam in given by the expression $$N \approx \frac{0.34}{1 - R}$$

Thus, resonance can be used to enhance the Faraday effect.

The optical isolator here disclosed, which has a gyrotropic medium within a resonant cavity to cause optical energy to traverse the gyrotropic medium a multiple number of times rather than only once, can be used with linearly polarized optical energy provided the basic principles of operation are understood. Specifically, linearly polarized optical energy in a gyrotropic medium in the presence of a magnetic field can be considered to be the sum of two components each being circularly polarized optical energy and each having opposite senses of rotation. The two components are of equal amplitude. In the gyrotropic medium, the optical energy component with the positive rotation travels at a rate which is different than that of the optical energy having negative rotation and the plane of the incident polarized optical energy is rotated in the direction of rotation of the component with the faster rate. Stated differently, the rotation of the plane of polarization of linearly polarized optical energy in a Faraday medium is the result of the difference in the refractive index of the medium for left-handed and right-handed circular polarizations. Thus, when transversing a gyrotropic medium, one component is delayed relative to the other. When the delay results in a phase difference of 90 degrees, the light emerges as linearly polarized optical energy having a polarization angle rotated 45 degrees from its original plane of polarization. Clearly, for this to occur, the amplitude of the two components must be equal. If they are not, the emerging light will be ellipti-cally polarized and the isolator will not operate as described.

Thus, at first glance, it appears that an isolator having a resonant cavity may present problems when used with linearly polarized optical energy because the effective indices of refraction for the right and left circularly polarized components are different and a resonant cavity cannot be simultaneously resonant for the two waves.

One solution is to tune the resonant cavity so that the resonant frequency of the cavity is at the midpoint between the resonant frequencies for the left and right circularly polarized optical energy. In this instance, the transmitted intensity will be equal for left and right circularly polarized optical energy and the transmitted optical energy will be linearly polarized. The rotation of the plane of polarization is given by the expression:

$$\theta_{GFP} = \theta_F + \tan^{-1}\frac{R\sin(2\theta_F)}{1 - R\cos(2\theta_F)} \approx \left[\frac{2F\sqrt{R}}{\pi} + 1\right]\theta_F$$

where F is the finesse and R is the reflectivity of the mirrors.
The approximation is valid for $$\theta_{GFP} < \frac{\pi}{5} = 36 \text{ degrees}$$

It is to be noted that there will be an insertion loss because the resonant cavity will be operating off resonance. It has been determined that the transmission loss is approximately 50% when a rotation of 45 degrees is achieved.

Another approach is to have the right and left circularly polarized optical energy operate at two separate resonances of the structure, one for each effective index of refraction. The loss in this mode of operation is minimum. However, the length of the resonant cavity must be chosen such that $$2(n_R - n_L)L = N\lambda$$

where
$n_R$, and $n_L$ are the indexes of refraction for right handed polarization and left-handed polarization.
N is an integer; and
λ is the wavelength.
As noted above, the loss in the optical isolator is minimum, however, the length of the resonant cavity is about twice the length required for a non-resonant optical isolator.

Figure 2:
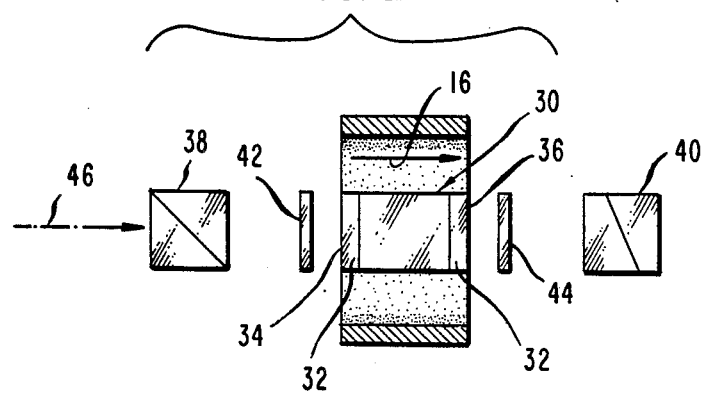
FIG. 2 is a schematic of one embodiment of structure in accordance with the principles of the invention.

A more desirable mode of operation is to use the device with circularly polarized optical energy and to tune the resonant cavity to the resonant peak of either the left circularly polarized optical energy or the right circularly polarized optical energy. Referring to FIG. 2, there is illustrated structure which operates in accordance with the principles of this mode of operation.

The optical isolator includes a resonant cavity 30 which consists of a gyrotropic medium 32 positioned between reflective surfaces 34, 36. In the FIG. the gyrotropic medium is in the form of a film on a support member. The reflective surfaces can be either dielectric or metallic mirrors deposited on the two end surfaces, or they can be distributed grating reflectors in a waveguide structure. The distance between the mirrors 34, 36 is adjusted to provide a resonant cavity for the circularly-polarized optical energy received from the input end of the optical isolator. A first linear polarizer 38 is positioned at the input end of the optical isolator; and a second linear polarizer 40 is positioned at the output end of the optical isolator. Located between the first linear polarizer 38 and the resonant cavity 30 is a first polarization conversion means 42 such as a ¼ wave plate; and, positioned between the resonant cavity 30 and the second linear polarizer 40 is a second polarization conversion means 44 such as a ¼ wave plate.

The basic mode of operation of the new improved optical isolator illustrated in FIG. 2 is clearly different from that of the conventional optical isolator illustrated in FIG. 1. Referring to FIG. 2, optical energy 46, traveling from the left, the forward direction passes through the first linear polarizer 38 which is oriented at a predetermined angle, and the linearly polarized optical energy which emerges from polarizer 38 is oriented at this angle. The linearly polarized optical energy is then converted to circularly polarized optical energy by passing it through the ¼ wave plate 42 which has its fast axis oriented at an approximate angle, i.e. 45 degrees relative to the axis of the linear polarizer 38. The circularly polarized optical energy from the ¼ wave plate 42 passes through the partially reflecting mirror 34 and enters the resonant cavity 30 which is resonant for this polarization. After being reflected back and forth a number of times in the cavity, the optical energy exits through the partially reflecting mirror 36 of the resonant cavity. The exiting optical energy has the same circular polarization it had when it entered the cavity. The optical energy from the resonant cavity 30, which is circularly polarized, is converted to linearly polarized optical energy by passing it through the second ¼ wave plate 44 which has its fast axis oriented at an appropriate angle. Thereafter, the linearly polarized optical energy from ¼ wave plate 44 is directed toward the second linear polarizer 40 oriented to pass the received optical energy.

Optical energy, traveling from right to left, the backward direction passes through the linearly polarizer 40, and emerges as linearly polarized optical energy oriented at the angle of the polarizer 40. This light is then passed through ¼ wave plate 44 and emerges as circularly polarized optical energy having a sense of rotation which is opposite to that of optical energy traveling from left to right when viewed in the same direction along the axis of the optical isolator. Thus, the circularly polarized optical energy which is traveling in the backward direction has a different rotation from circularly polarized optical energy which is traveling in the forward direction. Depending upon the direction of the magnetic field 16, the fields of circularly polarized optical energy with one sense of rotation will be rotating in the same direction as the precession of the magnetic moments in the Faraday material and, the fields of circularly polarized optical energy with the other sense of rotation will be rotating in the opposite direction as the precession of the magnetic moments. Thus, the index of refraction for the circularly polarized light traveling from the left through the resonant cavity will be different from the index of refraction for the circularly polarized optical energy traveling from the right through the resonant cavity. This occurs because the combination of polarizer and the ¼ wave plate forces a different sense of rotation on the light traveling in different directions. Because the optical energy originating from the right will travel through the resonant cavity at different speeds than the optical energy originating from the left, the resonance frequencies of the two circularly polarized beams will be different. In the embodiment of FIG. 2, the resonant cavity is designed to be resonant for the circularly polarized optical energy traveling from left to right. Thus, it will not be resonant for the circularly polarized optical energy traveling from right to left and the optical energy from the right will be attenuated by some amount which is dependent upon the resonant finesse and difference in the resonant frequencies. Thus, the device of FIG. 2 will pass optical energy traveling from left to right and will block optical energy traveling from right to left.

Figure 3:
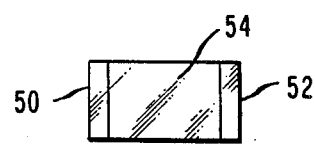
FIG. 3 is a view of a resonant cavity.

Referring to FIG. 3, there is illustrated a resonant cavity of the type which can be used in a device utilizing the principles of this invention. The resonant cavity consists of Bi-doped YIG crystal films grown on a gadolinium-gallium-garnet (GGG) substrate 54. The films are 2 um thick and support multilayer dielectric mirrors 50, 52 having an R of approximately 97.5%. For saturation magnetization, the total rotation of light passing perpendicularly through the two films is approximately ⅓ of a degree per pass. It is to be noted that there should be no significant linear birefringence in the films because linear birefringence can have a detrimental effect on the Faraday rotation.

Figure 4:
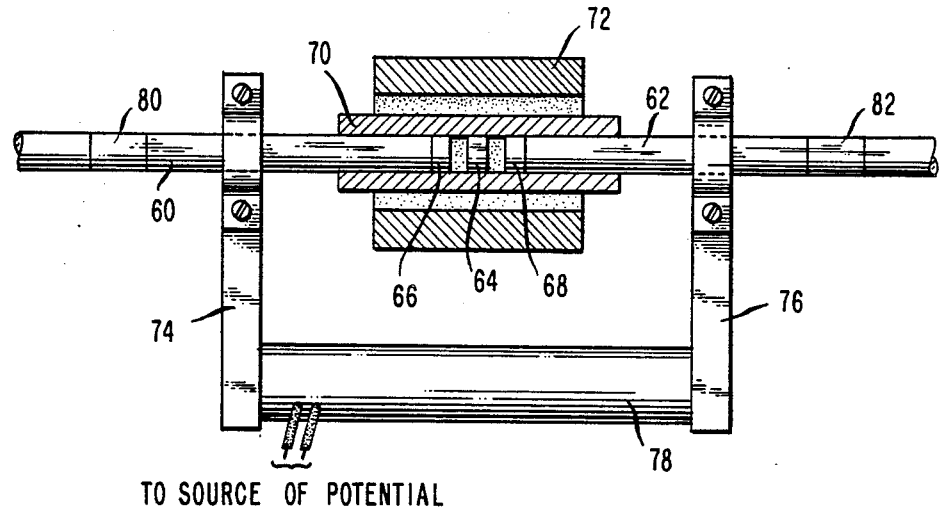
FIG. 4 is a schematic of a device incorporating the inventive optical isolator.

FIG. 4 discloses another embodiment of an optical isolator in accordance with the principles of this invention where the resonant cavity is the cavity of a fiber Fabry-Perot interferometer. A first optical fiber 60 is axially aligned with and spaced from a second optical fiber 62. Located between the ends of the two optical fibers is a thin film 64 of Bi-doped YIG. The ends 66, 68 of the optical fibers support partially reflective mirrors and a sleeve 70 is slideable positioned around the ends of the two fibers and the gyrotropic medium 64 to maintain the assemblage in alignment. For convenience, the film of Bi-doped YIG can be fixed to one of the partially reflective mirrors. A ring magnet 72 is positioned around the sleeve to provide the required magnetic field. A first member 74 is securely fastened, at one end, to fiber 60; and a second member 76 is securely fastened to fiber 62. A piezo-electric member 78 which changes size with the application of a potential is rigidly coupled to the first and second members 74, 76 to control the spacing between the two members 74, 76. The application of an appropriate potential to the piezo-electric member 78 will cause it to vary in size and, therefore, the spacing between the two members 74, 76. Thus, by applying an appropriate potential to the piezo-electric member 78, the spacing between the ends of the two fibers 60, 62 can be increased or decreased to provide a cavity of the required length. Polarizers and ¼ wave plates can be made in fiber form and, therefore, a polarizer and a ¼ wave plate can be incorporated within fiber 60 at location 80 and in fiber 62 at location 82. Thus, utilizing the principles of this invention, it is now possible to provide an all fiber optical isolator.

Figure 5:
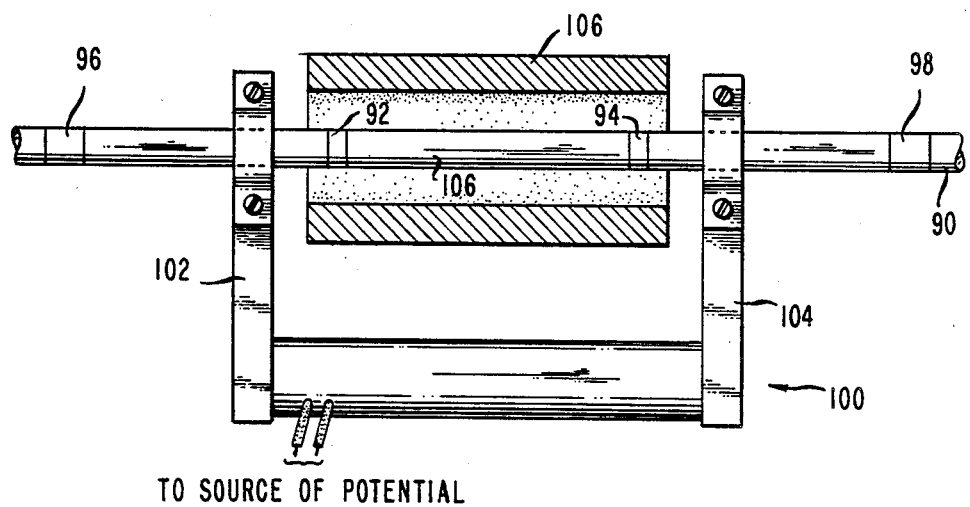
FIG. 5 is a schematic of another device incorporating the inventive optical isolator.

In 1845 Michael Faraday discovered that when a block of glass is subjected to a stray magnetic field, it becomes optically active, i.e., it has circular birefringence. When plane-polarized light is sent through glass in a direction parallel to the supplied magnetic field, the plane of polarization is rotated. Since Faraday's early discovery the phenomenon has been observed in many solids, liquids and gases. Thus, it becomes apparent that, utilizing the principles of this invention, the resonant cavity can be made of silica single-mode fiber. For example, referring to FIG. 5, a single mode fiber 90 is constructed to contain two reflective surfaces 92, 94, a first linear polarizer and a ¼ wave plate at 96, and a second linear polarizer and a ¼ wave plate at 98. A stretch member 100 which can consist of two arms 102, 104 coupled securely to the fiber in the area of the resonant cavity and selectively controlled to either electronically or mechanically stretch the optical fiber can adjust the length of the resonant cavity to a desired frequency. A ring magnet 106 can be positioned around the resonant cavity which uses, as the gyrotropic medium the fiber itself to provide the necessary magnetic field. If linear birefringence is present in the fiber, compensation measures may be required.

I claim:

1. An optical isolator comprising an input plane polarizer, an output plane polarizer, a resonant cavity positioned between said input plane polarizer and said output plane polarizer, and gyrotropic medium within said resonant cavity, said resonant cavity causing light polarized by the input plane polarizer to traverse the gyrotropic medium more than once before exiting through the output plane polarizer.

2. Apparatus as described in claim 1 wherein the length of the resonant cavity is defined by the relationship:

$$2(n_L - n_R)L = N\lambda$$

where
   $n_L$ is the index of refraction of right handed polarization;
   $n_R$ is the index of refraction of left handed polarization;
   N is an integer; and
   $\lambda$ is the wavelength.

3. Apparatus as described in claim 1 characterized by first polarization conversion means positioned between said input plane polarizer and said resonant cavity for converting plane polarized optical energy from said input plane polarizer to circularly polarized optical energy and second polarization conversion means positioned between said resonant cavity and said output plane polarizer for converting circularly polarized optical energy from said resonant cavity to plane polarized optical energy.

4. Apparatus as described in claim 3 wherein said resonant cavity comprises a gyrotropic medium positioned between two partially reflecting members.

5. Apparatus as described in claim 4 wherein said gyrotropic medium is an optical fiber.

6. The method of using an optical isolator to pass optical energy from a source traveling in a first direction and blocking reflected optical energy traveling in an opposite direction from reaching said source characterized by passing the optical energy from said source through a plane polarizer, passing the plane polarized optical energy from the plane polarizer through a resonant cavity having a gyrotropic medium, and tuning the resonant cavity to a predetermined frequency.

7. The method of using an optical isolator to pass optical energy from a source traveling in a first direction and blocking reflective optical energy traveling in an opposite direction from reaching said source characterized by
   converting the optical energy from the source into plane polarized optical energy,
   converting the plane polarized optical energy into circularly polarized optical energy,
   passing the circularly polarized optical energy through a resonant cavity having a gyrotropic medium,
   converting the circularly polarized optical energy from
   said resonant cavity into plane polarized optical energy, and
   passing said plane polarized optical energy through a plane polarizer.

* * * * *